June 8, 1926.

F. C. STEPHENS

Re. 16,360

NEEDLE AND ITS METHOD OF USE

Original Filed Sept. 25, 1923

INVENTOR
Frank C. Stephens
BY
Vernon E. Hodges
his ATTORNEY

Reissued June 8, 1926.

Re. 16,360

UNITED STATES PATENT OFFICE.

FRANK C. STEPHENS, OF WASHINGTON, DISTRICT OF COLUMBIA, ASSIGNOR, BY DIRECT AND MESNE ASSIGNMENTS, TO THE STELOS COMPANY, INC., OF WASHINGTON, DISTRICT OF COLUMBIA, A CORPORATION OF DELAWARE.

NEEDLE AND ITS METHOD OF USE.

Original No. 1,564,379, dated December 8, 1925, Serial No. 664,720, filed September 25, 1923. Application for reissue filed March 23, 1926. Serial No. 96,893.

My invention relates to an improvement in needles and its method of use.

In repairing the runs or ravels in knitted goods, other needles have been used, but they are not practical, as the method of use is a tedious one, and trying both to the eyes and patience of the operator. In other methods, the fabric is stretched over the finger tip, making it difficult to insert the hook beneath the thread. This objection is obviated in the present invention by stretching the fabric over a porcelain dish, allowing sufficient depth for the free use of the needle.

With other needles and their methods of use, the stretching of the fabric over the finger tip makes it difficult to see the separate threads, while with my invention and its method of use a white background is provided, making it possible to see the threads of any fabric, and of any color. It is impractical to use other needles with my method.

With other needles used for a similar purpose, the latch or bridge must be forced open by pressing against the thread or fabric and, in operation, can be opened in no other way. This has a tendency to catch the hook in the fabric or thread, and interfere with the work. The present invention overcomes this objection by reason of its peculiar construction. This, together with its magnetized area compels the latch to fly open at the proper time and greatly simplifies the work.

With other needles and their method of use, one thread holds the latch or bridge closed over the hook, and the thread to be looped must be forced into the hook while the latch is so closed. This is very unsatisfactory and unless great care is used in the operation, the thread holding the latch closed will slip off of the needle and allow the work to unravel. With my invention and its method of use, the latch reaches for and grasps the thread to be looped, forces it into the hook and the latch is then tightly closed by the loop already on the needle.

Other needles and their method of use require four separate motions to complete one purpose—two forward and two back. My invention and its method of use requires but one forward and one backward motion to accomplish the same purpose, thereby not only simplifying the work, but saving one-half the time and labor required by other methods.

With other needles and their method of use it is necessary to insert the hook into the first loop of the fabric to be repaired. This also applies where the partially repaired work has been slipped from the needle. With my invention and its method of use, the hook can be inserted at any point back of the running loop and the fabric run back to the loop that has been picked up. This makes it unnecessary to pick up a certain loop as must be done with other needles.

With other needles and their method of use, care must be used to see that each separate thread is picked up by the hook. This places a strain on the eyes. With my needle and its method of use this is not necessary as it is possible to pick up the threads faster than the eye can see the operation and therefore places no strain on the eyes.

My invention, owing to its construction, is suitable for doing various kinds of fancy work or stitches, when used by my method. Other needles are impractical for this class of work as there is no way by which they can be kept from becoming entangled in the threads or fabric.

With other needles and their method of use in case of error necessitating going back to a certain point, it is impossible to drop stitches from the needle without releasing it entirely from the work and picking it up again. With my needle and its method of use it is a very easy matter to drop from the hook one stitch at a time and go ahead again without delay.

Thus I have devised a simple hand operated needle of the character indicated, which may be utilized to do not only the work that similar needles can do, but various stitches and other work that other needles are not adapted to do. Not only this for whereas my needle will do the work that any other similar needle will do, no other needle will do the work that my needle will.

The needle itself consists of a magnetized hook at one end, curved laterally to a desired degree, off center; a magnetized latch or bridge pivoted in proximity to the hook and in position to open and close the latter with the operation of the needle, said latch or bridge being curved laterally to a degree to cause it to project slightly to one side of the hook when in closed position; the end of the needle opposite the hook terminating in a handle by means of which the needle is manipulated, the needle being notched or recessed at a point opposite the end of the latch or bridge when the latter is open, and a beveled side guard attached at the handle end to the right hand side of the needle and terminating, at its free end, near the hook. The hook and latch are magnetized so that when the ends of said hook and latch are brought together, they repel each other.

Figure 1:
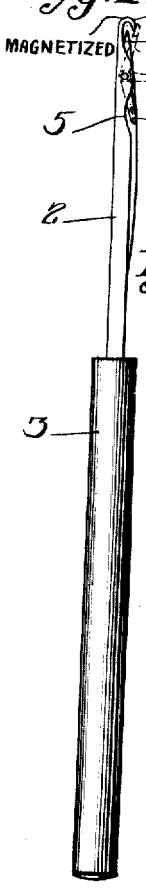
Fig. 1 is a side elevation of the needle.
Figure 2:
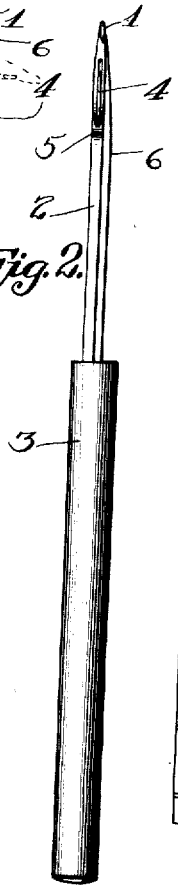
Fig. 2 is a front elevation of the same.

The numeral 1 represents the magnetized, curved hook at one end of the needle 2, and 3 is the handle. 4 is a magnetized, curved latch or bridge in proximity to the hook and in position to close the latter during a portion of the operation of knitting and repair. It also serves the hitherto unknown purpose of reaching for and grasping and forcing into the hook the thread necessary to be picked up in order to continue the looping process. A notch or recess 5, is formed in the needle, opposite the free end of the latch or bridge, when the latter is wide open, as viewed in Fig. 1, the purpose of which is to reduce the thickness at this particular point with the needle adapted more nearly to the thickness of thread or yarn and the size of loop and more particularly for the purpose of reducing the required movement of the needle in the operation to an extent corresponding to the depth of the notch or recess.

A beveled side guard 6 is placed along the right-hand side of the needle so that as the needle is pushed forward through the formed loop the latter slides back from the hook between the shank of the needle and the guard 6 and this relation insures that on the backward stroke the loop will force the latch forward to hold the next thread in the hook whereas any other thread will slide over the guard and will not operate to close the latch 4. On the rearward stroke the guard 6 also prevents the hook from catching the side of the fabric.

The present invention is wonderfully well adapted to the repair of "runs" in silk stockings, although it applies as well to breaks in the stitches of sweaters and other knitted or crocheted fabrics. By its use a stocking can be easily and quickly repaired by hand and restored to its original condition at slight expense. The skill required to operate the needle is easily acquired with a little practice.

Figure 4:
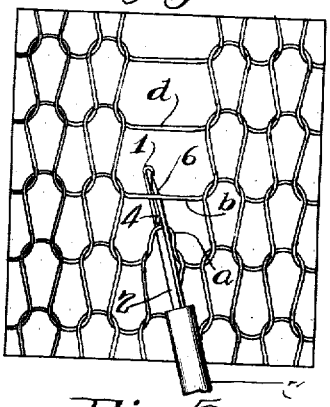
Figs. 4, 5 and 6 are views of the fabric and showing the different stitches in the method of hand knitting or repair.
Figure 7:
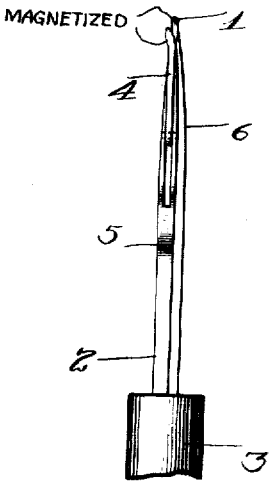
Fig. 7 is an enlarged fragmentary view of the hook and latch showing the latch in its closed position.
Figure 5:
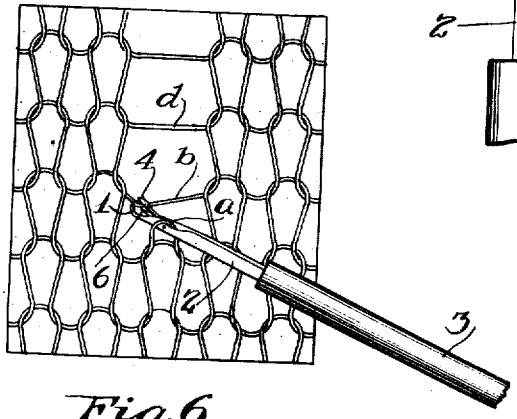
Figure 6:
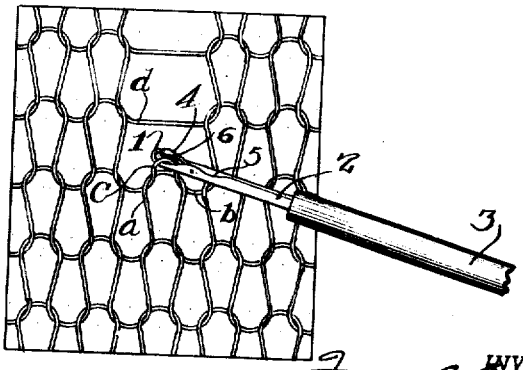
Figure 3:
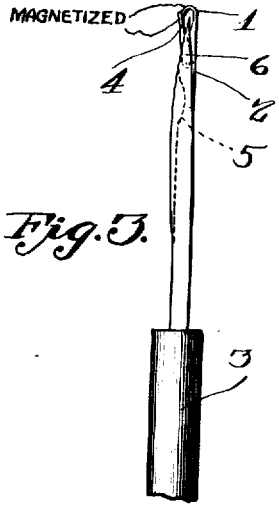
Fig. 3 is a view at right angles to Fig. 2 and showing the side guard.

While different stitches may be made by means of this needle, by ways of illustration one only has been shown in the several figures of the drawings from Figs. 4 to 6 inclusive, and in this particular stitch the method of operation is substantially as follows:

Referring to Figs. 4 to 6 of the drawings, an exaggerated view of a run in fabric such as a sweater or a stocking is shown. The operator at first inserts the magnetized hook 1 through the last loop *a* of the ravel or run and beneath the next thread *b*. The needle is then slid forward until the loop *a* slides over the free end of the latch or bridge 4. As the loop *a* is sliding toward the free end of the latch or bridge it spreads the free end of the side guard from the needle, and on the forward stroke this guard spreads the threads and facilitates the stroke. The needle is then pulled back in the reverse direction, the loop *a* sliding back against the latch or bridge and swinging it against the hook as clearly shown in Fig. 5, and the latch in the meantime reaching for and grasping the thread *b* and forcing it into the magnetized hook as shown in said Figure 5. If by any chance the hook should grasp more than one thread, the loop *a* will force the latch to one side of the hook and allow the loop *a* to also slide into the hook, thus blocking the operation and in this way preventing errors in the repair work. This is caused by the degree of curvature of both hook and latch. The operator now continues to pull the thread *b* which is held tight by the closing of the latch or bridge 4, against the hook, until a loop *c* is formed in the thread *b* and it is drawn through the loop *a* as clearly illustrated in Fig. 6. In the meantime, the guard as a result of its position and shape shields the latch point and prevents the thread *b* from catching behind the latch and closing it prematurely, and thus permitting the loop *a* to slip entirely off the hook without forming the new loop *c*. The hook and latch, being magnetized are like poles and repel each other when brought together, thus when the loop *c* is drawn through the loop *a*, as shown in Fig. 6, the magnetized latch 4 being repelled by the magnetized hook *l* will fly back into the position shown in Fig. 4.

The degree to which the hook and latch are curved in the needle, together with the magnetized points, compels the latch to reverse its action when the loop *a* slips off of it and facilitates its motion backward and away from the hook, the object of which being to fully open the latch before the commencement of the next forward stroke, thereby making more rapid work possible by preventing the latch from catching in the threads or fabric on the forward stroke.

The operator now lifts the needle carrying the loop *c* up over and around loop *a*, pushing the needle forward as in Fig. 4 through the loop *c*, and hook *l* is inserted beneath the next succeeding thread *d*. After the loop *c* shall have slid over the end of the latch or bridge and beyond it, the needle is reversed or pulled back, during which motion the latch reaches for and grasps the thread *d*, forces it into the hook, just as it has previously done with the thread *b* as shown in Figs. 5 and 6, and as thread *d* is pulled back the loop is formed in it, the guard, in this operation, performing its function as heretofore described. Thus the operation is repeated until the run or ravel is repaired, after which the end is held down by a thread or stitch.

The clearance afforded by the notch or recess 5 makes it possible to hold the needle down closer to the fabric, and greatly reduces the thickness of the combined needle and latch as well illustrated in Fig. 1, which is very desirable during the operation of knitting and repairing, as it lessens the pull and tension upon the threads and the loop.

In this way the fabric is easily and quickly repaired by hand, by the skilful manipulation of the hand needle. The loop may be fastened by a thread or stitch or other means, which will prevent the entire repair stitch from raveling out. When the fabric has been repaired, the structure of the stocking can be evened up by spreading the chains of stitches with the back of the needle. The guard 6 in this operation prevents the needle from penetrating the fabric.

I claim:

1. A needle having a hook and a side-guard extending in proximity to said hook.

2. A needle having a hook and a side-guard adjacent and extending alongside the hook.

3. A needle including means for receiving a thread, a latch co-operating therewith to confine the thread and adapted to be closed by a looped thread, and means for guarding the latch in its open position to prevent the closing thereof by any other thread except the looped thread.

4. A needle for repairing runs including a hook, a latch adapted to be closed by a looped thread, and a side-guard adjacent the free end of the latch when open for guarding the latch in its open position to permit the closing thereof by the looped thread and to prevent the closing thereof by any other thread.

5. A needle having an eye for receiving the thread, and a movable magnetized latch for closing said eye and retaining the thread therein.

6. A needle having a hook and latch magnetized so that when their ends are brought together, they repel each other.

7. A needle having a hook and latch, both of which are magnetized so that like poles are adjacent each other.

8. A needle having a permanently magnetized hook and a permanently magnetized latch pivoted in proximity to the hook, the magnetism of the hook and latch being of the same polarity.

9. A needle having a magnetized hook and a magnetized latch or bridge pivoted in proximity to the hook.

10. A needle having a hook, a pivoted latch and a side guard extending in proximity to the hook and latch.

11. A device of the character described, having a hook at one end and a latch pivoted in proximity thereto, the free ends of the hook and latch, both extending laterally to a plane extending longitudinally through the device.

12. A device of the character described, having a magnetized hook at one end and a magnetized latch pivoted in proximity thereto, the free ends of the hook and latch, both extending laterally to a plane extending longitudinally through the device.

13. A device of the character described, having a hook at one end, and a latch pivoted in proximity thereto, the free ends of the hook and latch both extending laterally, in opposite directions, to a plane extending longitudinally through the device.

14. A device of the character described, having a magnetized hook at one end, and a magnetized latch pivoted in proximity thereto, the free ends of the hook and latch both extending laterally, in opposite directions, to a plane extending longitudinally through the device.

15. A needle having a magnetized hook at one end, a magnetized latch or bridge pivoted in proximity to the hook and in position to open and close the latter with the operation of the needle, the needle being notched or recessed at a point opposite the free end of the latch or bridge when the latter is open.

16. A needle having a magnetized hook at one end, a magnetized latch or bridge pivoted in proximity to the hook and in position to open and close the latter with the operation of the needle, the needle being notched or recessed at a point opposite the free end of the latch or bridge when the latter is open, the magnetism of the hook and latch being of the same polarity.

17. A needle having a magnetized hook at one end, curved laterally to a desired degree off center, a magnetized latch or bridge pivoted in proximity to the hook and in position to open and close the latter with the operation of the needle, said latch or bridge being curved laterally to a degree to cause it to project slightly to one side of hook when in closed position, the needle being notched or recessed at a point opposite the end of the latch or bridge when the latter is open.

18. A needle having a magnetized hook and latch, which are magnetized to normally repel each other, the latch being positively closed by the material being operated upon.

19. A needle having a hook and latch, both of which are magnetized to repel each other, to cause the latch to open when not otherwise resisted, said latch being closed only by the material being operated upon by the needle.

20. A needle having a magnetized hook at one end, a magnetized latch or bridge pivoted in proximity to the hook and in position to open and close the latter with the operation of the needle, the needle being notched or recessed at a point opposite the end of the latch or bridge when the latter is open, and a beveled side guard attached at the handle end to one side of the needle and terminating at its free end near the hook.

21. A needle having a magnetized hook at one end, a magnetized latch or bridge pivoted in proximity to the hook and positioned to be magnetically repelled therefrom to open the latch, and to be positively closed by the material being operated upon, the needle being notched or recessed at a point opposite the free end of the latch when the latter is open, and a side guard attached at the handle-end and lying at one side of the needle and terminating at its free end in proximity to the hook.

22. A device of the character described including a hook and a guard extending alongside each other, the guard terminating in a sharply pointed end in proximity to the end of the hook.

23. An improved method of repairing runs or ravelings in a fabric which consists in stretching the fabric over a suitable holder, inserting a repairing device having a hook and pivoted latch through a loop formed in the run or raveling, continuing this movement on through the fabric while holding the device laterally out of alignment with the run or raveling until the loop has slid back over the end of the latch and beneath the latter, then reversing the movement of the device through the loop, catching the next forward thread in the hook while the loop is being pulled over the latch causing the latch to close over the thread, and the loop to be cast off over the end of the device, the thread caught in the hook thereupon forming a new loop, taking the place of the first-described loop, then reinserting the device into the fabric as before, and repeating the operation until the run or raveling has been repaired, and finally fastening the thread.

In testimony whereof I affix my signature.

FRANK C. STEPHENS.

DISCLAIMER

Re. 16,360. *Frank C. Stephens*, Washington, D. C. NEEDLE AND ITS METHOD OF USE. Patent dated June 8, 1926. Disclaimer filed July 16, 1935, by the assignee, *The Stelos Company, Inc.*

Hereby enters this disclaimer of that part of the claim in said specification which is in the following words, to wit:

"23. An improved method of repairing runs or ravelings in a fabric which consists in stretching the fabric over a suitable holder, inserting a repairing device having a hook and pivoted latch through a loop formed in the run or raveling, continuing this movement on through the fabric while holding the device laterally out of alignment with the run or raveling until the loop has slid back over the end of the latch and beneath the latter, then reversing the movement of the device through the loop, catching the next forward thread in the hook while the loop is being pulled over the latch causing the latch to close over the thread, and the loop to be cast off over the end of the device, the thread caught in the hook thereupon forming a new loop, taking the place of the first-described loop, then reinserting the device into the fabric as before, and repeating the operation until the run or raveling has been repaired, and finally fastening the thread."

[*Official Gazette August 6, 1935.*]